(12) United States Patent
Kato (10) Patent No.: US 7,562,420 B2
(45) Date of Patent: Jul. 21, 2009

(54) CLIP

(75) Inventor: Hiroyuki Kato, Utsumomiya (JP)

(73) Assignee: Newfrey LLC, Newark, DE (US)

( * ) Notice: Subject to any disclaimer, the term of this patent is extended or adjusted under 35 U.S.C. 154(b) by 434 days.

(21) Appl. No.: 11/246,073

(22) Filed: Oct. 11, 2005

(65) Prior Publication Data
US 2006/0104744 A1    May 18, 2006

(30) Foreign Application Priority Data
Oct. 15, 2004 (JP) .............................. 2004-301619

(51) Int. Cl.
*F16B 13/00* (2006.01)
*A44B 21/00* (2006.01)
(52) U.S. Cl. .......................................... 24/458; 24/297
(58) Field of Classification Search .................. 24/297, 24/453, 455, 457, 458, 289–295; 248/58, 248/60, 62–64, 67.5, 67.7, 71, 73, 74.1–74.3; 411/508–510, 913
See application file for complete search history.

(56) References Cited

U.S. PATENT DOCUMENTS

| 2,238,238 A | * | 4/1941 | Westrope | 24/293 |
| 3,126,183 A | * | 3/1964 | Kropp | 248/73 |
| 3,126,184 A | * | 3/1964 | Hopkins | 248/73 |
| 3,157,377 A | * | 11/1964 | Orenick | 248/71 |
| 3,210,032 A | * | 10/1965 | Van Slyke | 248/73 |
| 3,345,706 A | * | 10/1967 | Stokes | 24/458 |
| 4,334,659 A | * | 6/1982 | Yuda | 248/73 |
| 4,406,557 A | | 9/1983 | Suzuki et al. | |
| 4,701,984 A | * | 10/1987 | Wyckoff | 24/297 |
| 5,084,944 A | * | 2/1992 | Hileman | 24/453 |
| 5,421,067 A | * | 6/1995 | Akachi et al. | 24/297 |
| 5,762,397 A | * | 6/1998 | Venuto et al. | 297/284.4 |
| 5,845,883 A | * | 12/1998 | Meyer | 248/73 |
| 6,042,296 A | * | 3/2000 | Wittig et al. | 24/297 |
| 6,496,372 B1 | * | 12/2002 | Davison et al. | 24/297 |
| 6,747,209 B2 | * | 6/2004 | Uchida et al. | 174/68.1 |
| 6,773,051 B2 | * | 8/2004 | Davey et al. | 24/293 |
| 6,952,863 B2 | * | 10/2005 | Draggoo et al. | 24/297 |
| 7,036,779 B2 | * | 5/2006 | Kawaguchi et al. | 248/220.31 |
| 7,086,124 B2 | * | 8/2006 | Del Pozo Abejon | 24/295 |

FOREIGN PATENT DOCUMENTS

| JP | UM 57-63119 | 4/1982 |
| JP | 1-113609 | 7/1989 |
| JP | 5-66314 | 9/1993 |
| JP | 2000-046025 | 2/2000 |
| JP | 2001-191803 | 7/2001 |

* cited by examiner

*Primary Examiner*—Robert J Sandy
*Assistant Examiner*—Ruth C Rodriguez
(74) *Attorney, Agent, or Firm*—Stephen R. Valancius; Michael P. Leary (57) ABSTRACT

A clip (1) comprises a base (6), a shank (7) extending from the base (6), a pair of legs (9A, 9B) extending from an end of the shank towards the base and away from a side of the shank, and a pair of elastic fingers (11A, 11B) extending from the end of the shank towards the base and away from a side of the shank, juxtaposed with the legs. A curved end (12) is formed at the end of each finger to engage the edge of a mounting hole (5) in a workpiece. Complementary parts of a molded plastic clip, connected by a hinge, are fastened to one another before mounting of the clip.

17 Claims, 6 Drawing Sheets

CLIP

CROSS REFERENCE TO RELATED APPLICATION

This application claims the benefit of Japanese Application No. 2004-301619 filed Oct. 15, 2004, incorporated herein by reference.

BACKGROUND OF THE INVENTION

The present invention relates to a clip that can be attached to workpieces with different thicknesses, without play. More particularly, the invention is concerned with a clip of the type comprising a base, a shank extending from the base, and a pair of flexible legs extending from an end of the shank toward the base and away from a side of the shank.

A clip comprising a base, a shank extending from the base, and a pair of flexible legs extending from an end of the shank towards the base and away from the side of the shank is well known in the art. Engagement portions of the legs engage an edge of a mounting hole so as to mount the clip on a workpiece such as a panel when the shank and the legs are inserted into the mounting hole of the workpiece. An example of one of these clips is disclosed in Japanese Unexamined Utility Model Application Publication No. 1-113609 (Patent Document 1). In this clip, a slit is formed lengthwise in the pair of legs to divide them in two. The engagement portions divided in two are formed so as to engage the mounting hole in the workpiece. Because the pair of legs is divided in two to form a four leg configuration to engage the mounting hole, the mounting process can be performed reliably even when the dimensions of the mounting hole exceed tolerance or the hole is deformed.

A clip is disclosed in Japanese Unexamined Utility Model Application Publication No. 5-66314 (Patent Document 2) that comprises a base and a single leg extending integrally from the base. Here, the leg forms a special hook shape extending from the base. A leg with this special shape allows the clip to be mounted using a relatively small amount of insertion force. A shoulder is also formed between the base and leg that conforms to the edge of part of the mounting hole. Another shoulder is formed to conform to the edge of another part of the mounting hole. The hook-shaped leg works with the two shoulders in the mounting hole so that the clip does not come off the workpiece after being mounted.

Clips are disclosed in Japanese Unexamined Utility Model Application Publication 57-63119 (Patent Document 3: Corresponding to Examined Utility Model Application Publication 60-15941) and Japanese Unexamined Patent Application Publication 2000-46025 (Patent Document 4) that are mounted to a workpiece by inserting legs into a mounting hole on the workpiece. These clips have a base and legs that are divided vertically with a hinge connected to the base. The divided base and divided legs are connected to assemble the clip. A fuel cap engagement tool is disclosed in Japanese Unexamined Patent Application Publication 2001-191803 (Patent Document 5) that is used to engage a fuel cap without, for example, requiring a special engagement portion on part of a panel of a car body.

The clip in Patent Document 1 performs the mounting process reliably even when the dimensions of the mounting hole exceed tolerance or the hole is deformed, because the pair of legs is divided in two to form a four leg configuration to engage the mounting hole. However, this clip does not sufficiently adapt to workpieces of varying thickness, and does not engage thin workpieces effectively. An elastic plate-shaped portion can be formed on the base, and play-preventing fingers can be formed on the base or the shank to prevent play. However, such plate-shaped portions and play-preventing fingers require substantial mounting space on the workpiece. As a result, the clip cannot be used in tight places.

Because differences in plate thickness are absorbed by the front surface (exposed surface) of the workpiece, the mounting height of the clip of Patent Document 1, which depends on plate thickness, detracts from the appearance of the exposed surface. The clip in Patent Document 2 has a special-shaped leg that extends like a hook from the base. While this leg allows the clip to be mounted with very little insertion force, it cannot accommodate workpieces of varying thicknesses.

The clips in Patent Document 3 and Patent Document 4 have a base and legs that are divided vertically with a hinge connected to the base. The divided base and divided legs are connected to assemble the clip. These documents do not mention whether they can be mounted on workpieces of varying thicknesses without play. The clip in Patent Document 5 is used to engage a fuel cap without requiring a special engagement portion on part of a panel of a car body. However, this clip cannot be mounted on workpieces of varying thicknesses without play.

BRIEF DESCRIPTION OF THE INVENTION

An object of the present invention is to provide an improved clip that can be attached to workpieces with different thicknesses, without play.

In a preferred, but non-limiting embodiment, according to the present invention a clip comprises a base, a shank extending from the base, and a pair of legs extending from an end of the shank towards the base and away from a side of the shank. Ends of the legs have engagement portions for engaging the edge of a mounting hole to mount the clip on a workpiece such as a panel when the shank and the legs are inserted into the mounting hole of the workpiece. The clip further comprises a pair of elastic fingers extending from the end of the shank towards the base and away from the side of the shank, juxtaposed with the legs. A curved end is formed at the end of the fingers to engage the edge of the mounting hole in the workpiece, the curved end being curved along the underside of the base towards the side of the shank. The curved end has a rebounding force when engaged with the edge of the mounting hole that separates the curved end from the base and the shank regardless of the thickness of the workpiece.

The rebounding force of the fingers prevents the shank and base from having play against a workpiece after the clip has been mounted on the workpiece, regardless of the thickness of the workpiece. The prevention of play also prevents random noise, keeps the clip mounted on the workpiece properly, stabilizes the legs inside the mounting hole, and keeps the legs and thus the clip from coming off the workpiece due to vibrations. The curved portions absorbing the difference in plate thickness are on the back, not front, surface of the workpiece. As a result, the clip does not detract from the appearance of the exposed surface. Because the clip of the present invention does not require an elastic plate-shaped portion on the base or play-preventing fingers on the base or shank, the clip does not require substantial mounting space on the workpiece and, thus, can be used in tight places.

Preferably, the legs and the fingers are formed in pairs extending towards the center line of the shank, and a line joining the legs intersects a line joining the fingers at the shank. This distributes the retaining force of the legs and the play-opposing force of the fingers equally around the shank.

Preferably, the base is divided in two to form a first divided base portion and a second divided base portion, and the shank is divided in two to form a first divided shank portion and a second divided shank portion. The legs and the fingers bend back towards the first divided base portion and the second divided base portion from the ends of the first divided shank portion and the second divided shank portion. Preferably, the first divided shank portion extends from the first divided base portion integrally, and the second divided shank portion extends from the second divided base portion integrally, the first divided base portion is connected to the second divided base portion by a thin hinge, and the first divided shank portion and the first divided base portion are connected lengthwise to the second divided shank portion and the second divided base portion by a thin hinge.

Preferably, the respective thin hinges are turned on their center lines to connect the first divided base portion to the second divided base portion to form the base portion, and to connect the first divided shank portion to the second divided shank portion to form the shank portion. Preferably, a latch is formed in the first divided shank portion and the second divided shank portion to keep the base portion and the shank portion joined together. By dividing the base and the shank in two, the intricate internal shape of the base and shank is exposed. This makes molds for forming the clip simpler. It also makes it easier to attach other components to the base. Here, the components are connected to each other and then joined to the base. This makes the assembly process easier.

Preferably, the base has a holding portion serving as a mounting component for the workpiece in order to hold a connector at the end of a strap. In this way, a strap, such as the strap to a fuel cap, can be connected to a portion of a workpiece, such as a panel of a car body, without requiring a special engagement portion.

BRIEF DESCRIPTION OF THE DRAWINGS

The invention will be further described in conjunction with the accompanying drawings, which illustrate a preferred (best mode) embodiment, and in which.

Figure 12:
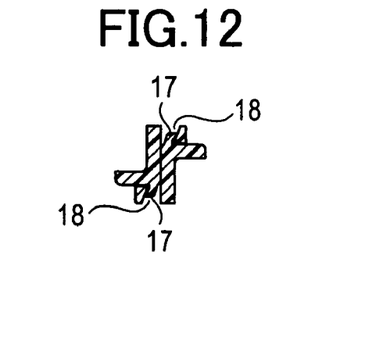
FIG. 12 is a cross-sectional view of the clip from line 12-12 in FIG. 11.
Figure 13:
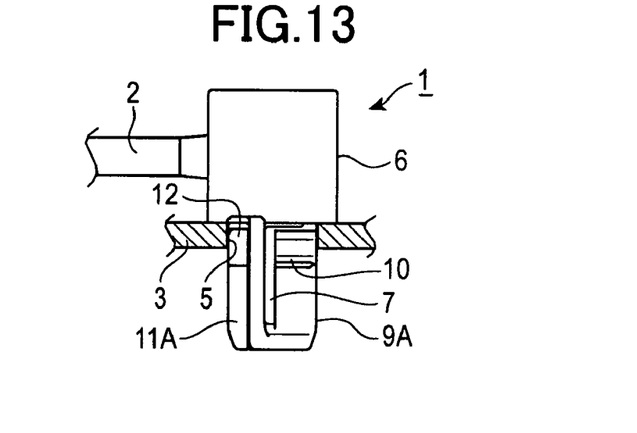
FIG. 13 is a right side view of the clip in FIG. 7 used to mount a strap to a workpiece.
Figure 14:
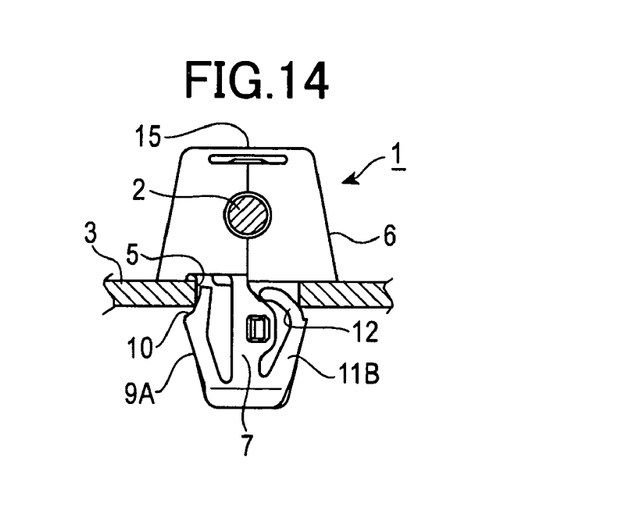
FIG. 14 is a front view of the clip in FIG. 13.
Figure 15:
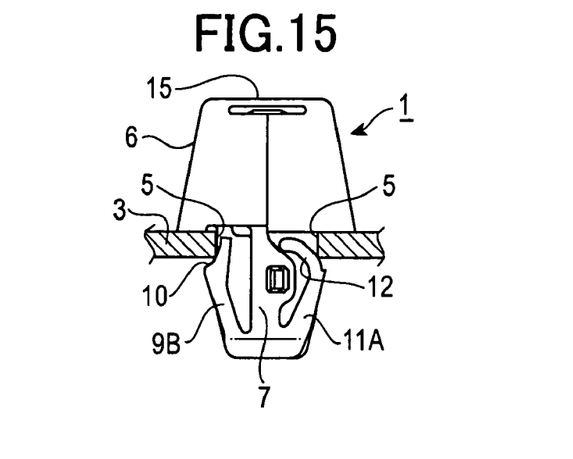
FIG. 15 is a rear view of the clip in FIG. 13.
Figure 16:
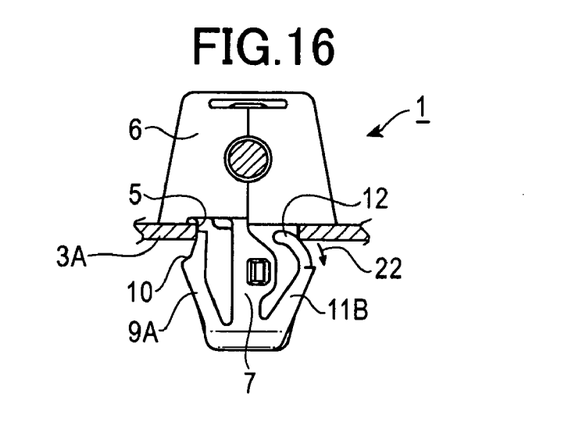
FIG. 16 is a front view of a clip similar to the one in FIG. 14 attached to a thin workpiece.
Figure 17:
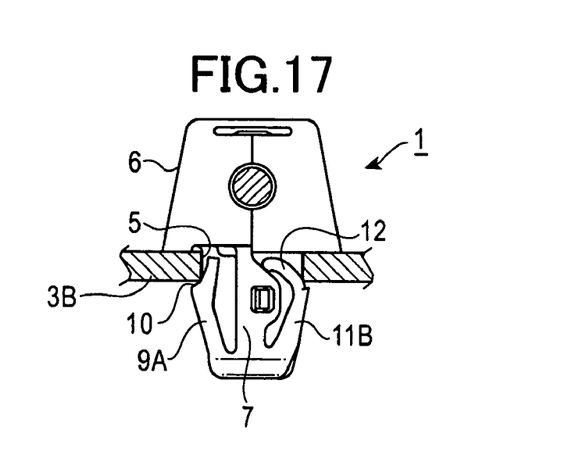
FIG. 17 is a front view of a clip similar to the one in FIG. 14 attached to a thick workpiece.

The following is an explanation of a clip in an embodiment of the present invention with reference to the drawings. FIGS. 1-6 show the clip 1 before complementary parts thereof are fastened together, and FIGS. 7-12 show the clip 1 after the parts are fastened together. FIGS. 13-15 show the clip 1 mounted in a mounting hole 5 in a workpiece 3 such as a car body to fasten an end of a strap 2 extending from a fuel cap. FIG. 16 and FIG. 17 show the action of the fingers (described below) on the clip 1 when mounted to workpieces of different thicknesses. In this embodiment, as shown in FIG. 1 through FIG. 6, the clip 1 is divided in two vertically to form two portions during molding, and parts remain unfastened from one another before use. Complementary parts of the clip 1 are fastened together only when it is mounted on the workpiece 3 as shown in FIG. 7 through FIG. 12. The clip 1 shown in FIG. 13 through FIG. 15, holds the end of a strap 2, and is mounted in the mounting hole 5 on the workpiece 3 while holding the strap 2.

Figure 1:
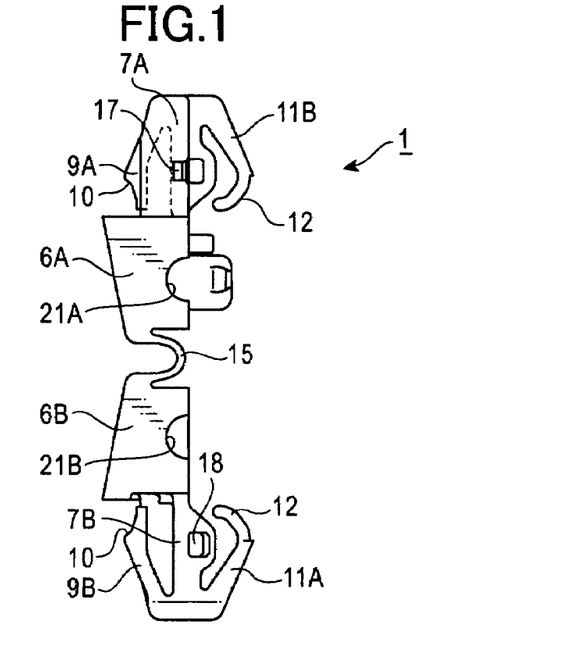
FIG. 1 is a front view of a clip in a first embodiment of the present invention before being divided in two and fastened.
Figure 2:
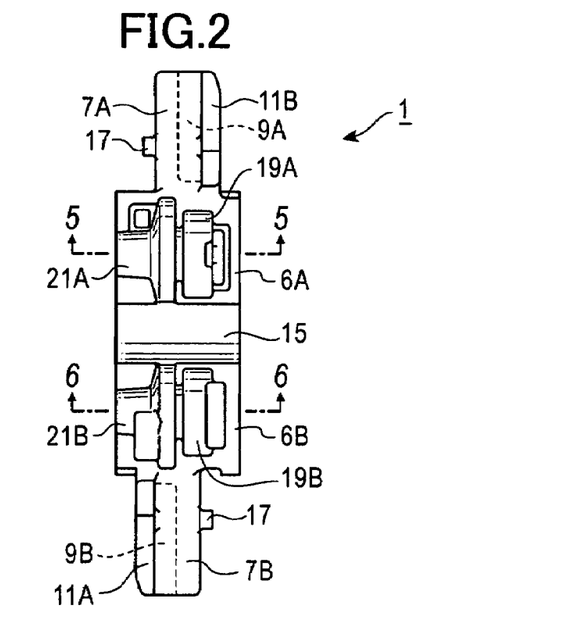
FIG. 2 is a right side view of the clip in FIG. 1.
Figure 3:
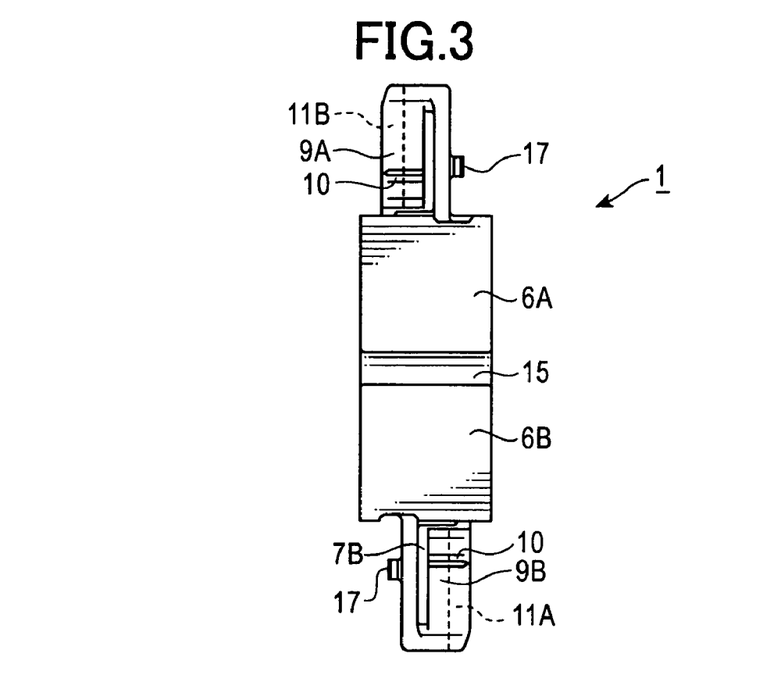
FIG. 3 is a left side view of the clip in FIG. 1.
Figure 4:
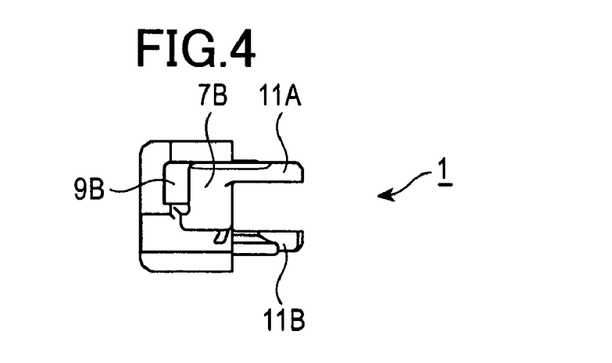
FIG. 4 is a bottom view of the clip in FIG. 1.
Figure 5:
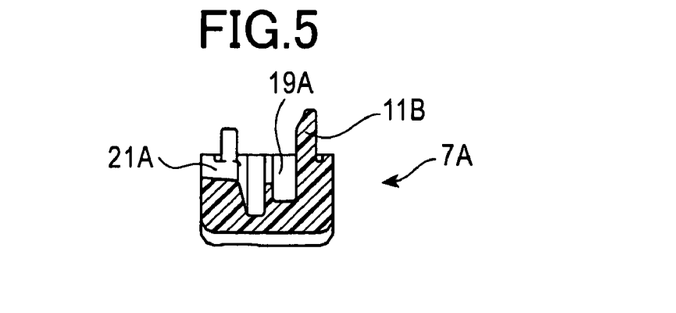
FIG. 5 is a cross-sectional view of the clip from line 5-5 in FIG. 2.
Figure 6:
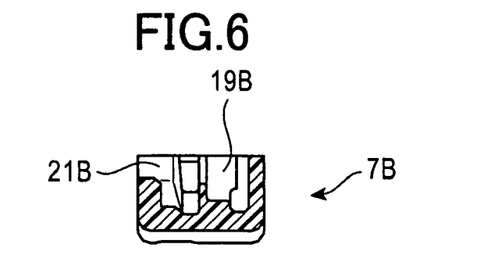
FIG. 6 is a cross-sectional view of the clip from line 6-6 in FIG. 2.
Figure 7:
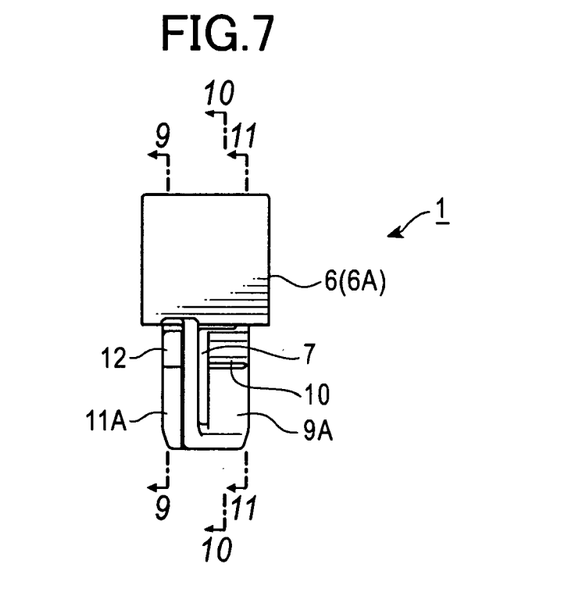
FIG. 7 is a right side view of the clip in FIG. 1 after being fastened.
Figure 8:
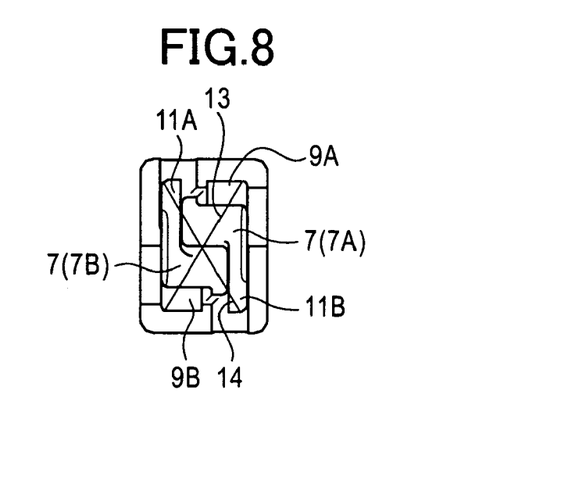
FIG. 8 is a bottom view of the clip in FIG. 7.
Figure 9:
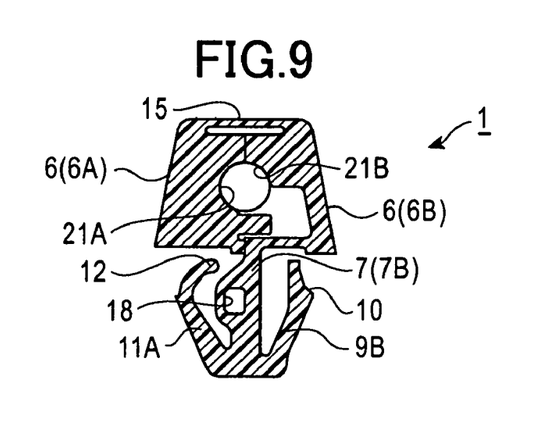
FIG. 9 is a cross-sectional view of the clip from line 9-9 in FIG. 7.
Figure 10:
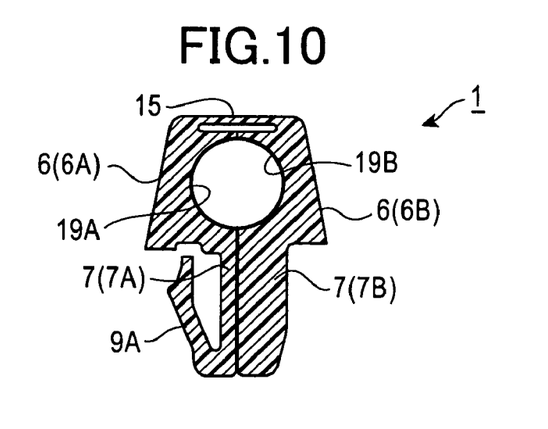
FIG. 10 is a cross-sectional view of the clip from line 10-10 in FIG. 7.
Figure 11:
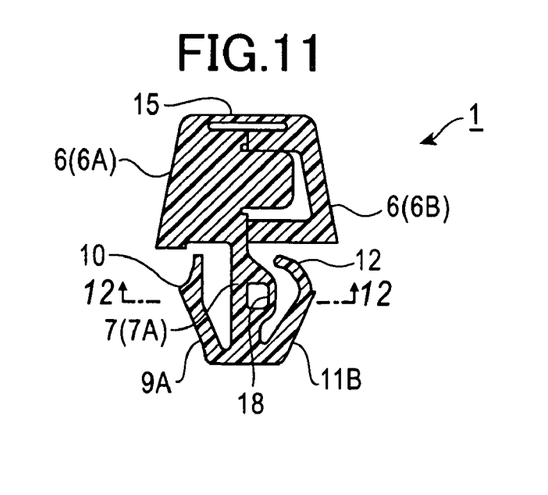
FIG. 11 is a cross-sectional view of the clip from line 11-11 in FIG. 7.

The following is an explanation with reference to FIG. 7 through FIG. 9 of the clip 1, before its complementary parts are fastened together as shown in FIG. 1 through FIG. 6, and after its complementary parts are fastened together as shown in FIG. 7 through FIG. 12. As shown in FIG. 1, clip 1 is preferably an integral elongated molded product made of hard plastic. As shown in FIG. 1 through FIG. 6, the clip 1 is molded so as to be divided into two complementary parts axially, and the two divided parts connect together at a base 6. As shown in FIG. 1 through FIG. 3, the split extends the entire length. The clip 1, as shown in FIG. 7 and FIG. 9, comprises the base 6, a shank 7 extending from the base 6, and a pair of elastic legs 9 extending from the end of a shank 7 towards the base and away from a side of the shank 7. In FIG. 1 through FIG. 6, the base 6 includes a first divided base portion 6A and a second divided base portion 6B. The shank 7 includes a first divided shank portion 7A extending from the first divided base portion 6A and a second divided shank portion 7B extending from the second divided base portion 6B. One of the legs 9 is a first leg 9A extending towards the first divided base portion 6A from the end of the first divided shank portion 7A and away from the side of the first divided shank portion 7A, and the other leg is a second leg 9B extending towards the second divided base portion 6B from the end of the second divided shank portion 7B and away from the side of the second divided shank portion 7B. A shoulder 10 is formed at the end of the legs 9A, 9B to engage the edge of a mounting hole in the workpiece.

The clip 1 also has a first elastic finger 11A as shown at the bottom of FIG. 1 extending from the end of the second divided shank portion 7B towards the second divided base portion 6B and away from the side of the second divided shank portion 7B (upward in FIG. 1) opposite the second leg 9B, and a second elastic finger 11B as shown at the top of FIG. 1 extending from the end of the first divided shank portion 7A towards the first divided base portion 6A and away from the side of the first divided shank portion 7A (downward in FIG. 1) opposite the first leg 9A.

The first finger 11A and the second finger 11B constitute a pair of fingers. After the divided portions are fastened together, as shown in FIG. 7 through FIG. 12, the length of the clip molding is reduced (Cf. FIG. 1). The first finger 11A then extends parallel to the first leg 9A towards the base 6 and away from the side of the shank 7, and the second finger 11B extends parallel to the second leg 9B towards the base 6 and away from the side of the shank 7. As shown in FIG. 9 (and FIG. 11), curved ends 12 are formed at the ends of the elastic fingers 11A, 11B that curve towards the second divided shank portion 7B underneath the base 6 towards the bottom of the base. In FIG. 1, the curved end 12 on elastic finger 11A curves upward in a convex shape towards the side of the second divided shank portion 7B, and the curved end 12 on the elastic finger 11B curves downward in a convex shape towards the side of the first divided shank portion 7A. The curved ends 12 have a portion that engages the edge of a mounting hole in the workpiece. When engaging the edge of the mounting hole in the workpiece, their shape and elasticity produce a rebounding force that separates them from the base 6 and the shank 7 regardless of the thickness of the workpiece. This rebounding force is able to prevent play of base 6 and shank 7 with respect to the workpiece regardless of the thickness of the workpiece.

After parts of the clip 1 have been fastened together, as shown in FIG. 7 and FIG. 8, the first leg 9A and the second leg 9B oppose each other with the shank 7 in the center, and the first finger 11A and the second finger 11B oppose each other with the shank 7 in the center. As shown in FIG. 8, a line joining the legs 9A, 9B intersects a line joining the fingers 11A, 11B at the shank 7. This distributes the retaining force of the legs 9A, 9B and the play-opposing force of the fingers 11A, 11B equally around the shank 7, and secures the clip 1 to the workpiece firmly without any play.

In the clip 1, the first divided shank portion 7A extends integrally from the first divided base portion 6A, the second divided shank portion 7B extends integrally from the second divided base portion 6B, and the first divided base portion 6A is connected to the second divided base portion 6B by a thin hinge 15. In this way, the entire clip 1 is integral. The first divided shank portion 7A, the first divided base portion 6A, the thin hinge 15, the second divided base portion 6B and the second divided shank portion 7B all extend lengthwise. By connecting the first divided base portion 6A and the second divided base portion 6B divided down the center lengthwise with a thin hinge 15, the intricate internal shape of the base 6 and shank 7 are exposed. This makes the mold for the clip 1 simpler.

When fastening parts of the clip 1 together, the thin hinge 15 is turned around its center line. The first divided base portion 6A and the second divided base portion 6B are fastened together to form the base 6, and the first divided shank portion 7A and the second divided shank portion 7B are fastened together to form the shank 7. In this way, the fastening operation is simple. In order to keep the base 6 and the shank 7 on the clip 1 fastened together, a latch is formed on the first divided shank portion 7A and the second divided shank portion 7B. The latch comprises a protrusion 17 and a recess 18 on the first divided shank portion 7A and the second divided shank portion 7B. Two pairs of protrusions 17 and recesses 18 can be formed to hold parts of the clip together. FIG. 12 shows each protrusion 17 engaging a corresponding recess 18 to keep the clip fastened. When the divided base 6 and shank 7 are turned around the thin hinge 15 to fasten them together and another component such as a strap 2 (see FIG. 13) is attached to the base 6, the other component is preferably attached to the base 6 before the clip is fastened. The clip is then fastened and mounted. This makes the mounting process easier.

The base 6 in this clip 1 can include a holder for holding the connected end of a strap 2 extending from a fuel cap (not shown). The holder comprises semicircular recesses 19A, 19B and semicircular recesses 21A, 21B with a smaller diameter than the semicircular recesses 19A, 19B formed in the first divided base portion 6A and the second divided base portion 6B (FIG. 1, FIG. 2, FIG. 5, FIG. 6). The connected end of the strap 2 is housed in the semicircular recesses 19A, 19B, and the strap 2 extends from the smaller-diameter semicircular recesses 21A, 21B. In this way, the clip 1 can be used to mount a fuel cap on a part of a car body such as a panel (workpiece) without having to form a special engagement portion.

If semicircular recesses 19A, 21A are formed in the first divided base portion 6A and semicircular recesses 19B, 21B are formed in the second divided base portion 6B to form the connector for the strap 2 as shown in FIG. 13, and if the first divided base portion 6A and the second divided base portion 6B are fastened together, the strap 2 can be held by the base 6 after it is fastened together. This makes the holding operation simpler.

After it has been fastened, the clip 1 comprises the base 6, the shank 7 extending from the base 6, the pair of legs 9A, 9B extending from the end of the shank 7 towards the base 6 and away from a side of the shank 7, and the pair of elastic fingers 11A, 11B extending from the end of the shank 7 towards the base 6 and away from a side of the shank 7, juxtaposed with the legs 8A, 9B. A curved end 12 is formed at the end of the fingers 11A and 11B to engage the edge of the mounting hole 5 in the workpiece. The curved end 12 is curved along the underside of the base 6 towards a side of the shank 7. When the curved end 12 is engaged with the edge of the mounting hole, it has a rebounding force that separates it from the base 6 and the shank 7 regardless of the thickness of the workpiece. The rebounding force from the curved end 12 of the fingers 11A and 11B keeps the base 6 and shank 7 attached to the workpiece without play, regardless of the thickness of the workpiece. The legs 9A and 9B also have shoulders 10. When the shank 7 and the legs 9A and 9B are inserted into the mounting hole in the workpiece, the shoulders 10 engage the edge of the mounting hole and the workpiece is mounted. The clip 1 is mounted to the workpiece in this way.

In FIG. 13 through FIG. 15, the end of a strap 2 extending from a fuel cap is held by the base 6, and the clip 1 is mounted on a workpiece 3 such as a panel on a car body. When the first divided base portion 6A and the second divided base portion 6B are fastened together to form the base 6, the recesses 19A, 19B, 21A, 21B (FIG. 9 and FIG. 10) are fastened together to form a holder in the base 6 for the end of the strap 2. The legs 9A, 9B are inserted into the mounting hole 5 in the workpiece 3, the shoulders 10 engage the edge of the mounting hole 5, the clip 1 is mounted on the workpiece and, thus, the strap 2 is mounted on the workpiece 3.

As shown in FIG. 14 and FIG. 15, the curved ends 12 of the fingers 11A, 11B engage the edge of the mounted hole 5. The shape and elasticity of the curved ends 12 produce a rebounding force that separates them from the bottom surface of the base 6 and the side surface of the shank 7. The fingers themselves are attached to the mounting hole 5, and the rebounding force of the curved ends 12 is able to prevent play of base 6 and shank 7 with respect to the workpiece regardless of the thickness of the workpiece.

FIG. 14, FIG. 16 and FIG. 17 show clips 1 mounted on workpieces 3, 3A, 3B of varying thicknesses. The workpiece 3A in FIG. 16 is thinner than the workpiece 3 in FIG. 14, and the workpiece 3B in FIG. 17 is thicker than the workpiece 3 in FIG. 14. As shown in the drawings, the leg 9A has a shoulder 10 that engages the edge of the mounting holes 5 in the workpieces 3, 3A, 3B. Finger 11B has a curved end 12 that engages the edge of the mounting holes 5 in the workpieces 3, 3A, 3B. Although not seen in the drawings, leg 9B and finger 11A engage the mounting holes 5 in a similar manner. The curved ends 12 engage the edge of the mounting hole 5 in a different position depending on the thickness of the workpiece 3, 3A, 3B. The rebounding force of the curved ends 12 applies and maintains strong pressure against the edge of the mounting hole 5.

As shown by arrow 22 in FIG. 16, the force applied and maintained on the edge of the mounting hole 5 when the clip 1 is mounted on a thin workpiece 3A is the same strength as the force applied and maintained on workpieces 3, 3B with different thicknesses (FIG. 14 and FIG. 17). Whether the workpiece is thick or thin, the curved ends 12 reliably make contact with the edge of the mounting hole and the rebounding force separates them from the bottom surface of the base 6 and the side surface of the shank 7. As a result, the fingers 11A, 11B prevent play by the base 6 and shank 7 against the workpiece regardless of the thickness of the workpiece.

As mentioned above, the curved ends 12 of the fingers 11A, 11B strongly engage the edge of the mounting hole 5 and the fingers themselves fix the clip 1 to the workpiece, so that the rebounding force from the fingers prevents play of the base 6 and shank 7 against the workpiece regardless of the thickness of the workpiece. The prevention of play also prevents random noise, keeps the clip mounted on the workpiece properly, stabilizes the legs inside the mounting hole, and keeps the legs from coming out of the workpiece. It also maintains the strong force of the legs 9A, 9B, and secures the clip 1 to the workpiece. The curved ends 12 absorb the difference in workpiece thickness on the back side and not the front side of the workpiece 3, 3A, 3B. As a result, the appearance of the workpiece is not compromised. As a result, the base 6 does not require an elastic absorption plate, and the base 6 or shank 7 does not require play-preventing fingers. This reduces the mounting area on the workpiece and allows the clip to be attached in narrow confines.

While a preferred embodiment of the invention has been shown and described, changes can be made without departing from the principles and spirit of the invention, the scope of which is defined in the following claims.

What is claimed is:

1. A clip comprising a base, a shank extending from the base, and a pair of legs extending from an end of the shank towards the base and away from a side of the shank, an end of each leg having an engagement portion for engaging an edge of a mounting hole of a workpiece to mount the clip on the workpiece when the shank and the legs are inserted into the mounting hole of the workpiece, wherein the clip further comprises a pair of elastic fingers extending from the end of the shank towards the base and away from a side of the shank, juxtaposed with the legs, wherein a curved end is formed at the end of each finger to engage the edge of the mounting hole in the workpiece, the curved end being curved along the underside of the base towards a side of the shank, and wherein the curved end has a rebounding force when engaged with the edge of the mounting hole that separates the end from the base and the shank regardless of the thickness of the workpiece; and wherein the base has a holding portion therein to hold a connector at the end of a strap.

2. The clip described in claim 1, wherein the legs and the fingers are formed in pairs extending towards a center line of the shank, and wherein a line joining the engagement legs intersects a line joining the engagement fingers at the shank.

3. The clip described in claim 1, wherein the base is divided in two to form a first divided base portion and a second divided base portion, wherein the shank is divided in two to form a first divided shank portion and a second divided shank portion, and wherein the legs and the fingers bend back towards the first divided base portion and the second divided base portion from the ends of the first divided shank portion and the second divided shank portion.

4. The clip described in claim 3, wherein the first divided shank portion extends integrally from the first divided base portion and the second divided shank portion extends integrally from the second divided base portion, wherein the first divided base portion is connected to the second divided base portion by a thin hinge, and wherein the first divided shank portion and the first divided base portion are connected lengthwise to the second divided shank portion and the second divided base portion by a thin hinge.

5. The clip described in claim 4, wherein the respective thin hinges are turned on center lines to connect the first divided base portion to the second divided base portion to form the base portion, and to connect the first divided shank portion to the second divided shank portion to form the shank portion.

6. The clip described in claim 5, wherein a latch is formed in the first divided shank portion and the second divided shank portion to keep the base portion and the shank portion joined together.

7. The clip described in claim 6, wherein the complementary parts are connected to opposite ends of a hinge that is bendable to permit the parts to be juxtaposed and fastened to one another.

8. A clip comprising two complementary parts that are joined together to form, from corresponding elements of the parts, a base, a shank extending from the base, elastic legs extending from an end of the shank and away from a side of the shank, and elastic fingers extending from the end of the shank, the legs being constructed for insertion in a mounting hole of a workpiece to mount the clip on the workpiece, wherein the complementary parts are connected to opposite ends of a hinge that is bendable to permit the parts to be juxtaposed and fastened to one another.

9. The clip described in claim 8, wherein the legs have curved ends.

10. The clip described in claim 8, wherein each of the elastic fingers has a shoulder disposed to engage an edge of the mounting hole.

11. A clip comprising two complementary parts that are joined together to form, from corresponding elements of the parts, a base, a shank extending from the base, elastic legs extending from an end of the shank and away from a side of the shank, and elastic fingers extending from the end of the shank, the legs being constructed for insertion in a mounting hole of a workpiece to mount the clip on the workpiece, wherein the clip is a one-piece elongated plastic molding, the length of which is reduced when the complementary parts are fastened to one another.

12. A clip comprising:

a base, a shank extending from the base, at least one leg extending from an end of the shank towards the base, an end of the at least one leg having an engagement portion for engaging an edge of a mounting hole of a workpiece to mount the clip on the workpiece when the shank and the legs are inserted into the mounting hole of the workpiece, at least one elastic finger extending from the end of the shank towards the base, wherein a curved end is formed at the end of the at least one finger to engage the edge of the mounting hole in the workpiece, the curved end being curved along the underside of the base towards a side of the shank, and wherein the curved end has a rebounding force when engaged with the edge of the mounting hole that separates the end from the base and the shank regardless of the thickness of the workpiece, wherein the at least one leg has a different shape than the at least one elastic finger; and wherein the base, the shank, the at least one leg and the at least one elastic finger are made of the same material.

13. The clip according to claim 12, wherein the at least one leg comprises two legs.

14. The clip according to claim 12, wherein the at least one elastic finger comprises two elastic fingers.

15. The clip according to claim 12, wherein the clip comprises two complementary parts that are joined together to form, from corresponding elements of the parts, the base, the shank extending from the base, the at least one elastic leg and the at least one elastic finger.

16. The dip according to claim 12, wherein the base, the shank, the at least one leg and the at least one elastic finger are made of a plastic.

17. The clip according to claim 12, wherein the clip is integrally elongated molded and made of a hard plastic.

* * * * *